United States Patent [19]
Blasius

[11] Patent Number: 5,922,296
[45] Date of Patent: Jul. 13, 1999

[54] METHOD FOR MAKING PARTICULATE SODIUM POLYBORATE

[75] Inventor: James R. Blasius, Scottsdale, Ariz.

[73] Assignee: In-Cide Technologies, Inc., Phoenix, Ariz.

[21] Appl. No.: 08/942,627

[22] Filed: Oct. 2, 1997

[51] Int. Cl.$^6$ .......................... C01B 35/12; C09K 21/02
[52] U.S. Cl. .................. 423/279; 106/18.13; 241/16; 252/607
[58] Field of Search .................. 252/607; 106/18.13; 423/283, 279; 241/16

[56] References Cited

U.S. PATENT DOCUMENTS

| | | | |
|---|---|---|---|
| 3,336,155 | 8/1967 | Rowe | 264/4.3 X |
| 3,383,165 | 5/1968 | Campbell, Jr. | 423/283 |
| 4,156,654 | 5/1979 | Blasius | 423/283 X |
| 4,285,842 | 8/1981 | Bird et al. | 252/607 X |
| 4,289,662 | 9/1981 | Blasius | 252/607 |
| 4,377,506 | 3/1983 | Sprague | 252/609 |
| 4,801,404 | 1/1989 | Dietrich et al. | 252/607 |
| 4,834,913 | 5/1989 | Aseltine et al. | 252/601 |
| 4,950,410 | 8/1990 | Pennmartz | 252/7 |
| 5,411,213 | 5/1995 | Just | 241/16 |

FOREIGN PATENT DOCUMENTS 37947   3/1977   Japan .

OTHER PUBLICATIONS

Kirk–Othmer Encyclopedia of Chemical Technology, "Talc", vol. 19, pp. 608–614 (1969).

*Primary Examiner*—Richard D. Lovering

[57] ABSTRACT

The disclosed method minimizes the tendency of sodium polyborate (the chemical compound obtained from boric acid and sodium sulfate) to set up into a plaster of Paris-like mass during the reaction of concentrated sulfuric acid and a hydrate of sodium tetraborate. By adding a relatively small amount of talc at an early stage in the process of making sodium polyborate, the amount of shear force needed to break up the sodium polyborate product into small particles is greatly decreased. The resulting dry, free-flowing, finely-divided product is useful as, among other things, a pesticide and a fire-retardant agent.

13 Claims, No Drawings

METHOD FOR MAKING PARTICULATE SODIUM POLYBORATE

FIELD OF THE INVENTION

This invention relates to a method for preparing the chemically-bound combination of boric acid ($H_3BO_3$) and sodium sulfate ($Na_2SO_4$) known as "sodium polyborate" (CAS registry no. 183290-63-3), by reaction of sodium tetraborate and sulfuric acid. An aspect of this invention relates to a method for facilitating particle formation and size reduction of a freshly-prepared mass of sodium polyborate. Still another aspect of this invention relates to the preparation of an essentially dry, free-flowing mass of sodium polyborate particles.

DESCRIPTION OF THE PRIOR ART

Boric acid ($H_3BO_3$ or $B[OH]_3$) is a very useful compound and has been employed commercially in, among other things, biocides, wood preservatives, and fire retardant agents. See, for example, U.S. Pat. No. 4,801,404 (Dietrich et al), issued Jan. 31, 1989.

Boric acid can be prepared by acidification of readily available sodium salts such as sodium tetraborate pentahydrate ("5-mole borax") and sodium tetraborate decahydrate ("10-mole borax").

Analytical studies have established that the boric acid/sodium sulfate reaction product which results when a mole of sodium tetraborate is reacted with 0.95–0.98 mole of sulfuric acid in a slurrying amount of water is a true chemical compound, "sodium polyborate". It has been discovered that sodium polyborate is approximately as effective as boric acid per se (pure $H_3BO_3$) for a variety of uses, e.g. as a pesticide (particularly for cockroaches) and as a fire-retardancy treatment for cellulosic insulation. The sodium sulfate ($Na_2SO_4$) component of sodium polyborate either enhances the utility of the boric acid or does not seriously detract from it. (Sulfates have been included in fire-extinguishing compositions; see U.S. Pat. No. 4,950,410, to Pennartz, issued Aug. 21, 1990.) Thus, since the formation of sodium sulfate is unavoidable in any event when sulfuric acid is reacted with sodium tetraborate, use of sodium polyborate is an attractive alternative to the use of boric acid, the complexities of recovering pure boric acid being thereby eliminated. (Because it is a chemical, not a physical, combination, the boric acid/sodium sulfate reaction product which is known as sodium polyborate cannot be separated by simple physical methods, and recovery of boric acid per se from this product is difficult.)

Although the boric acid/sodium sulfate combination has not always been referred to in the patent literature as "sodium polyborate", the product formed under the conditions and with the molar amounts described above—see U.S. Pat. No. 4,156,654 (Blasius), issued May 29, 1979 and U.S. Pat. No. 4,289,662 (Blasius), issued Sep. 15, 1981—is in fact this compound. See also U.S. Pat. No. 4,377,506 (Sprague), issued Mar. 22, 1983, and U.S. Pat. No. 4,834,913 (Aseltine et al), issued May 30, 1989.

When sodium tetraborate is reacted with sulfuric acid, the reaction is exothermic; moreover, in an aqueous reaction medium the relatively concentrated sulfuric acid preferred for use in this reaction generates a significant amount of heat. In one respect, this heating of the reaction mixture is helpful in that it drives off water from the product, and the resulting sodium polyborate, though still moist, is a relatively dry mass which can be sheared to form small particles and can be dried to well below 20 weight-% moisture content with a modest expenditure of energy. In another respect, however, the reaction exotherm is problematic. Heating of the reaction mixture (which includes some water) has an effect similar to the curing or setting of a plaster of Paris material. The product can undergo cement-like setting or cure, thereby resisting the shearing forces applied by the mixer. In addition, the resulting sodium polyborate particles tend to adhere to each other and form lumpy masses rather than free-flowing particles. These lumpy masses have much less surface area than finely-divided particles and hence require more heat energy to bring them to dryness.

According to Aseltine, U.S. Pat. No. 4,834,913, the borax/sulfuric acid reaction can be carried out in a combined reaction and drying apparatus, wherein a countercurrent flow of drying gases is introduced and applied to the reaction product, thereby decreasing the tendency of the reaction product to form lumpy masses.

Japanese Patent Disclosure No. 1977-37947 describes the preparation of a filler for fire-resistant building materials by reacting sulfuric acid with borax in the presence of a porous inorganic refractory aggregate such as pearlite, so that the porous aggregate will become impregnated with the sodium sulfate/boric acid mixture.

However, there is still a need for a mechanically uncomplicated method for facilitating the size reduction of freshly-prepared sodium polyborate, preferably a method in which the setting-up of the product into a cement-like state is significantly minimized by changes made in the formulation stage, e.g. by appropriate selection of ingredients for the reaction mixture.

SUMMARY OF THE INVENTION

It has now been discovered that particle formation and size reduction of a freshly prepared mass of sodium polyborate can be facilitated by distributing a ground-up, essentially hydrophobic, hydrous silicate in the sodium tetraborate before it is converted to sodium polyborate. Sulfuric acid can be added to the sodium tetraborate (borax) even before the distribution of the hydrous silicate is completed, but, since the borax/sulfuric acid reaction begins within a few minutes (typically less than five, e.g. within about two minutes), the distribution of the hydrous silicate particles should be nearly complete if not totally complete before the sulfuric acid is added. The hydrous silicate is not porous, since it is not desired to have the sodium polyborate absorbed into a silicate structure. In addition, it is not desired that the hydrous silicate form a plastic, hardenable mass in the presence of water, hence ground-up, essentially hydrophobic hydrous silicates having an average particle size of at least about 0.5 $\mu$m are preferred over clay-like materials of colloidal size (0.001 to 0.1 $\mu$m in particle diameter). Like clays, however, the hydrous silicate has a layered crystalline structure. The preferred hydrous silicate is talc.

Uniform distribution of the hydrous silicate is efficiently accomplished when the sodium tetraborate (preferably "5-mole borax") is partially but not completely dissolved in a relatively small amount of water, e.g. about 3 to about 10 moles of water per mole of borax..

It has been found that, not only is the shearing of the freshly-prepared sodium polyborate made much easier by the addition of the hydrous silicate, the drying of the resulting particulate sodium polyborate is greatly facilitated due to a substantial increase in surface area. There is no need to remove the hydrous silicate from the final product; it does not detract from the desired properties of the sodium polyborate and even helps insure good flowability of the particulate mass, due to an effect much like an anti-caking action.

Moreover, incorporation of talc into the formulation (which, although this invention is not bound by any theory, may involve incorporation into the sodium polyborate matrix) minimizes sticking of the product to the dryer and thereby facilitates cleaning of the dryer during maintenance periods.

Stated another way, this invention is a method for making an essentially dry, free-flowing particulate composition comprising the compound sodium polyborate, wherein the method comprises:

a. distributing a ground-up, essentially hydrophobic, hydrous silicate (a hydrous silicate which has a non-porous, layered-crystalline structure and an average particle size or particle diameter ranging from about 0.5 to 100 μm) essentially uniformly throughout a mass comprising particulate sodium tetraborate, to obtain a first essentially uniform composition (this first composition, then, comprises particulate sodium tetraborate and the aforementioned hydrous silicate), b. adding sulfuric acid to the particulate sodium tetraborate, this addition being initiated not more than five minutes prior to the completion of the distributing step; the result is a second essentially uniform composition comprising sodium polyborate and the hydrous silicate, and c. applying shearing force to this second composition to reduce the average particle size of the sodium polyborate, preferably to a predetermined particle size range suited for commercial use, e.g. as a pesticide or as a fire-retardant additive for insulation.

DETAILED DESCRIPTION
I. The Hydrous Silicate

The preferred hydrous silicate used in this invention is "talc", a term which, in the strictest sense, refers to a distinct chemical compound, the hydrous magnesium silicate $Mg_3Si_4O_{10}(OH)_2$, which calculates out to 31.7% MgO, 63.5% $SiO_2$, and 4.8% $H_2O$, but in a broader sense "talc" can refer to a variety of naturally occurring minerals which contain this hydrous magnesium silicate. The term "talc" is used in this application to refer to minerals containing a major amount of the hydrous magnesium silicate $Mg_3Si_4O_{10}(OH)_2$ as well as the hydrous magnesium silicate itself.

The pure hydrous magnesium silicate has a crystalline structure which includes a magnesium oxide/magnesium hydroxide ("brucite") sheet sandwiched between two silica sheets. A single repeating unit of the crystal could thus be represented, in a somewhat oversimplified manner, as an tri-magnesium oxide/hydroxide inner layer

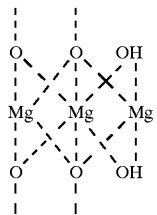

linked, at the top and the bottom, with an —$Si_2O_3$— "sheet". Perhaps more realistically, the repeating unit could be considered to be a divalent $Si_8O_{12}$ "sheet" at the top linked to a divalent $Mg_{12}O_{16}(OH)_8$ interlayer sandwiched in the middle of the unit which interlayer is in turn linked to a second divalent $Si_8O_{12}$ "sheet" at the bottom. Each complete talc layer is thus made up of the silica sheet/magnesium oxide-hydroxide interlayer/silica sheet "sandwich" and is electrically neutral. These complete, electrically neutral layers are superimposed indefinitely, but the superimposed layers are held together only by weak van der Waals forces. The characteristic slippery property of talc is believed to result from the ability of these sandwich-like layers to slide over one another.

The crystal form of talc can be foliated, lamellar, fibrous, or massive. Foliated and lamellar crystal forms are preferred. The lamellar or platy talcs are strongly hydrophobic. Although talc is inert toward most chemical reagents, it exhibits an alkaline pH, typically 9.0 to 9.5.

The natural minerals typically referred to as "talc" can vary significantly in their content of the hydrous magnesium silicate, $Mg_3Si_4O_{10}(OH)_2$, described above. In these natural minerals, the aforementioned hydrous magnesium silicate can be associated with tremolite, a calcium magnesium silicate; the magnesium silicates anthophyllite and/or serpentine; and chlorite. Chlorite is a talc-like mineral in which varying proportions of aluminum are substituted for magnesium in the brucite interlayer. Impurities which are not magnesium and/or aluminum and/or calcium silicates can be present in natural mineral "talc", e.g. carbonates, such as dolomite and calcite; oxides such as iron oxide, quartz, and magnesium oxide, and elements such as carbon.

All of these natural minerals, even those containing non-silicate impurities (since the natural minerals are, in accordance with this invention, selected to contain a major amount of the hydrous magnesium silicate) are useful in this invention. However, all natural minerals do not work with equal effectiveness, and minerals containing a high percentage (e.g. at least about 90% by weight) of the hydrous magnesium silicate are preferred. Minerals of adequate purity are available from several sites in the United States, including New York, Texas, California, and Texas, but the most preferred minerals are obtained from Montana. Montana talc approaches theoretical purity, has good color, and is strongly hydrophobic. (The pure hydrous magnesium silicate is a hydrophobic compound.)

The natural deposits can be massive in nature and are typically ground up with jaw or gyratory crushers. The crushed mineral has an average particle size smaller than 100 μm and can typically satisfy the specification of 99+% (by weight) passing through a 200 mesh (U.S. or Tyler) screen. It is ordinarily preferred that the maximum particle diameter of the talc particles does not exceed 75 μm, e.g. ≦45 μm, but coarse talcs (e.g. >6 μm, more typically >30 μm, in average particle size) are operative in this invention Montana talcs are available in the "superfine" range of 30 μm or smaller, the smallest particle sizes being in the ranges of from about 0.5 to about 6 μm, on average However, size reduction to the colloidal particle size range is both impractical and undesirable in the context of this invention.

Even the finest grades of Montana talc have no adverse impact upon the raw material cost for making sodium polyborate. Ordinarily, borax (e.g. 5-mole borax) is more costly than essentially pure talc.

Although this invention is not bound by any theory, it is believed that the following properties of hydrous magnesium silicates such as talc are important: substantial hydrophobicity (preferably strong hydrophobicity), a low degree of porosity which will not permit appreciable water absorption, a coarser-than-colloidal particle size, and a layered crystalline structure, preferably layers which are held together by weak physical forces and can slide relative to each other. Other silicates which can have some or all of these properties include silicates in which the magnesium is partially or wholly replaced by aluminum, e.g. chlorite and pyrophyllite. Pyrophyllite is the aluminum analog of talc and has the theoretical composition $Al_2SiO_4O_{10}(OH)_2$. As a result, pyrophyllite has some of the properties of hydrous magnesium silicate talc.

Although clays which form plastic mixtures with water and can harden to form massive objects are not suitable as such to substitute for talc, the layered structures of kaolinite, endellite, mica, hydrated montmorillonite, and chlorite are in many ways analogous to the layered structure of talc, hence such layered structures, in appropriate particle sizes, can be useful to facilitate size reduction.

Although this invention is not bound by any theory, the setting-up or hardening of sodium polyborate during or after the reaction of borax with sulfuric acid is believed to be analogous, to some degree, to the hardening of wet cement compositions, because the hardening of cement is largely a process involving the breakdown of chemically-bound water phases and the resultant formation of new chemically-bound water phases. The forms of borax preferred for use in this invention contain either five moles or ten moles of water of hydration, and this chemically bound water, along with the free water added to form a borax slurry, is or are believed to participate in the sodium polyborate-forming chemical reaction in some manner. (In the open, sodium tetraborate pentahydrate can lose water of hydration at temperatures below its decomposition temperature of 200° C.) Formation of lumps or solid chunks of sodium polyborate may also be driven, at least in part, by the reaction exotherm. Again, this invention is not bound by any theory, but the presence of an essentially hydrophobic, layered silicate is believed to inhibit aggregation effects, such as the adherence of sodium polyborate particles to each other, and/or to form microscopic strata which facilitate the breakup of a lumpy sodium polyborate product into relatively small, essentially individualized particles.

II. The Method

The method of this invention can be practiced on either a semi-continuous or batch basis, as described in Blasius, U.S. Pat. Nos. 4,156,654 and 4,289,662, the disclosures of which are incorporated herein by reference. Ordinarily, the first step in the process is to form a slurry with an aqueous medium (such as tap water) and borax, preferably 5-mole borax (sodium tetraborate pentahydrate). Water can play a desirable role in the chemical reaction which follows, provided the amount of water is limited to a slurrying amount (e.g. 3 to 10 moles per mole of borax), i.e. an amount which is sufficient to dissolve only part of the borax, the rest of the borax being suspended or dispersed in water. Another advantage of forming a borax slurry is that it greatly facilitates the uniform distribution (suspension or dispersion) of the hydrous silicate throughout the slurried mass of borax particles. Thus, although dry combining of ingredients or combining of ingredients in other media besides aqueous media can be employed in this invention, provided that a sufficiently uniform composition containing borax and hydrous silicate is obtained, it is preferred that the distribution of the hydrous silicate in the borax be carried out in an aqueous slurry medium.

It is believed to be essential that the uniform distribution of the hydrous silicate in the borax be complete or substantially complete before the chemical reaction between borax and sulfuric acid begins. Typically, the setting-up effect occurs rather rapidly as soon as the sulfuric acid and borax begin to react, and a significant amount of setting up of the reaction mixture can make it extremely difficult if not impossible to achieve uniform distribution of the hydrous silicate. One way to insure this uniform distribution of the hydrous silicate is to complete the distribution even before any sulfuric acid is added. However, there can be a slight delay in the commencement of the sulfuric acid/borax reaction after addition of the sulfuric acid (typically, the delay is less than five minutes and may be less than two or three minutes), and one can take advantage of this delay by adding the sulfuric acid just a few minutes before completion of the distribution of the hydrous silicate in the borax.

The mixing zone for the borax, the hydrous silicate, and the sulfuric acid can be a single vessel, provided with a mechanical stirrer, e.g. a stirrer of the conventional paddle design, driven by an electric motor or the like. If the setting up of the sodium polyborate product is not properly controlled, the difficulty of breaking up the cement-like product is manifested in terms of high power requirements for the motor driving the stirrer. Electric power savings ranging from 20 to 40% have been observed when this invention is practiced. The reduced need for power to the stirrer can, by itself, range from about 20 to about 35%. Additional power is saved in the drying step, since the increased surface area of the product makes it easier to eliminate the moisture remaining after the borax/sulfuric acid reaction.

Commercial grades of sulfuric acid can be used for the borax/sulfuric acid reaction. Relatively concentrated sulfuric acid is preferred, e.g. those grades containing more than 90% by weight sulfuric acid (ranging, for example, from 66° Baume to oleum or "fuming" sulfuric acid), substantially the balance, if any, being water.

In a less preferred embodiment, the borax and hydrous silicate are combined (presumably, physically combined) together first in a dry state or non-aqueous medium or a smaller amount of water, and the entire amount or balance of the slurry water is added with the sulfuric acid. This less preferred embodiment greatly increases corrosion risks.

The heat of the reaction between the borax and the sulfuric acid drives off a large amount of the aqueous medium. The paddle stirrer, of course, continues to operate throughout the process, and the result is a mass of moist particles and essentially no continuous aqueous phase. With the aid of the hydrous silicate, the shearing forces applied by the stirrer reduce the particle size of the sodium polyborate significantly. A major amount of the moist but free-flowing particles discharged from the mixing/reaction zone will pass a 3 mesh (U.S.) screen, as in the Blasius process described in U.S. Pat. No. 4,289,662, but the power requirements for obtaining this minus 3 mesh, high surface-area product are, as pointed out previously, greatly decreased. This minus 3 mesh product can be dried with mildly elevated temperatures, using dryer air inlet temperatures ranging from 90 to about 150 C, preferably 100 to 125 C.

Before the drying step, the moisture content of the product can exceed 20% by weight. After drying, the moisture content is much lower and can approach bone dryness, if desired.

The amount of sulfuric acid used in this process, as in the known Blasius process, ranges from 0.95 to 0.98 mole per mole of borax (preferably 5-mole borax). The amount of water preferably ranges from 3 to 10 moles per mole of borax. The amount of hydrous silicate (preferably talc) is not critical and is generally a minor amount by weight with respect to the weight of the entire reaction medium (borax+ sulfuric acid+water). Typical amounts of talc range from 0.1 to 15% by weight, more typically 0.5 to 5% by weight, based on the weight of the reaction medium. As little as 1 to 2% by weight of talc, on this basis, results in substantial power savings due to more efficient operation of the stirrer and the dryer.

If a sodium polyborate product finer than −3 mesh is desired, further screening or pulverization can be employed, and oversize particles can be recycled and crushed or pulverized.

The resulting dry, free-flowing particulate sodium polyborate is especially useful in pesticides and in treatment of cellulosic insulation.

The invention is illustrated by the following non-limiting Examples, wherein parts or percentages are by weight unless otherwise indicated.

EXAMPLE

Using a mixer for a batch process, the following components were charged to the mixer:

5,000 pounds (2.27 metric tons) of 5-mole borax, 72 gallons (272 liters) of tap water, 150 pounds (68 kg) of Montana talc, and 108 gallons (408 liters) of 66° Baume sulfuric acid.

With the mixer continuously in operation, the 5-mole borax was first blended with more than half of the tap water and slurried, since not all of the 5-mole borax will dissolve in such a small amount of water. The talc was added to the slurry, agitation being continued by operation of the mixer, and water was added continuously until almost the entire 72 gallons had been introduced into the mixer. The sulfuric acid was added, however, shortly before the addition of the water was complete. Less than 5 minutes after the addition of the sulfuric acid, the reaction between the borax and the sulfuric acid began, with considerable generation of heat, with increased demands upon the mixer, and with formation of sodium polyborate as substantially the sole product. (Although sodium polyborate is officially designated a true chemical compound by Chemical Abstracts, father than a mere physical mixture, it is presently believed that the talc is physically rather than chemically combined with the sodium polyborate, hence the product could be characterized as a sodium polyborate/talc mixture.) The heat of the reaction drove off a substantial amount of water, resulting in the formation of a moist, particulate product. The moist product was then dried to a free-flowing, particulate state and passed through a classifier. Oversize particles were recycled.

COMPARISON EXAMPLE

A batch of sodium polyborate was prepared in accordance with the working Example described above, except that the addition of talc was omitted. It was found that the electric power consumed for the operation of the mixer was considerably higher than in the above Example. Energy requirements for the dryer were also higher. The total energy saving attributable to the talc addition step was estimated to be 35%.

What is claimed is:

1. A method for making an essentially dry, free-flowing particulate composition comprising the compound sodium polyborate, said method comprising:

a. distributing a ground-up, essentially hydrophobic, hydrous silicate essentially uniformly throughout a mass comprising an aqueous medium and particulate sodium tetraborate, to obtain a first essentially uniform composition comprising the aqueous medium, particulate sodium tetraborate and said ground-up, essentially hydrophobic, hydrous silicate, said ground-up, essentially hydrophobic, hydrous silicate having an essentially non-porous, layered-crystalline structure and an average particle size ranging from about 0.5 to 100 $\mu$m, b. adding sulfuric acid to the particulate sodium tetraborate, said adding step being initiated not more than five minutes prior to the completion of said distributing step, to initiate an exothermic chemical reaction which drives out water and to obtain a second essentially uniform composition comprising sodium polyborate and said ground-up essentially hydrophobic, hydrous silicate, and c. applying shearing force to said second essentially uniform composition to reduce the average particle size of the sodium polyborate in said second essentially uniform composition.

2. The method according to claim 1, wherein a free-flowing mass comprising particulate sodium polyborate and said ground-up essentially hydrophobic, hydrous silicate and having a moisture content less than 20% by weight is recovered as the product of said method.

3. The method according to claim 1, wherein said ground-up, essentially hydrophobic, hydrous silicate comprises talc particles.

4. The method according to claim 3, wherein the talc particles are foliated, lamellar, or platy in shape.

5. The method according to claim 3, wherein the talc particles have an average size ranging from about 0.5 to about 30 $\mu$m.

6. The method according to claim 1, wherein the sodium tetraborate comprises sodium tetraborate pentahydrate.

7. The method according to claim 1, wherein the aqueous medium is a slurrying amount of water.

8. The method according to claim 7, wherein said exotherm drives sufficient water out of said second essentially uniform composition to obtain a moist, non-adherent particulate mass having a moisture content less than said slurrying amount of water.

9. The method according to claim 8, wherein said moist, non-adherent particulate mass is heated to drive out additional moisture and obtain an essentially dry, free-flowing product.

10. The method according to claim 1, wherein said adding step is initiated approximately simultaneously with the completion of said distributing step.

11. A method for facilitating particle formation and size reduction of a freshly prepared mass of sodium polyborate, comprising the steps of:

a. distributing talc particles essentially uniformly throughout sodium tetraborate particles in an aqueous slurrying medium and adding sulfuric acid not more than five minutes prior to the completion of said distributing step, to obtain a sodium polyborate composition containing talc particles and, b. applying shearing force to the sodium polyborate composition containing talc particles until a predetermined average particle size of the sodium polyborate particles is obtained.

12. The method according to claim 11, wherein the sodium polyborate particles of the predetermined average particle size are heated essentially to dryness.

13. The method according to claim 11, wherein the talc particles have a purity of at least about 90% by weight.

* * * * *